United States Patent Office 3,257,445
Patented June 21, 1966

3,257,445
PURIFICATION OF ACRYLONITRILE
Otto Roelen, Oberhausen-Holten, and Walter Rottig, Oberhausen-Sterkrade Nord, Germany, assignors to Ruhrchemie Aktiengesellschaft, Oberhausen-Holten, Germany, a corporation of Germany
No Drawing. Filed June 22, 1961, Ser. No. 125,622
Claims priority, application Germany, June 23, 1960, R 28,191
4 Claims. (Cl. 260—465.3)

This invention relates to a process for the purification of unsaturated aliphatic nitriles and more particularly it relates to a process for the purification of acrylonitrile.

In the known process for the production of acrylonitrile by catalytic oxidation of propylene in the presence of ammonia and oxygen, raw products are recovered, the processing of which presents a number of difficulties. The basis for the difficulties lies in the nature of the secondary products or impurities formed in the synthesis and present in varying amounts in the raw product. Frequently, as, for example, in the subsequent distillation of the raw product, they give rise to the formation of polyacrylonitrile, interference with the distillation process in the still and particularly in the column and, furthermore, separation of certain of these by-products is complicated in that the boiling points of the by-product and acrylonitrile are very close together. Still further, it is desirable that these by-products or impurities be substantially completely removed as the same decrease the tray efficiency in the distillation considerably.

It has now been found that secondary products and impurities formed in the synthesis of unsaturated aliphatic nitriles and, in particular, acrylonitrile can be substantially removed and pure unsaturated aliphatic nitriles recovered if the contaminated saturated aliphatic nitrile product is treated by washing with caustic, whereby hydrocyanic acid is removed, subsequently washing with water and/or dilute acid, adjusting the pH value of the washed product to about 5–7 with acid, and thereafter subjecting the resulting product to fractional distillation.

For carrying out the process of the invention, the raw product obtained from the catalytic synthesis is treated, first, for removal of the hydrocyanic acid invariably present by treatment with alkali. The raw product as, for example, acrylonitrile, is treated with about 10–20% alkali solution as, for instance, sodium hydroxide or potassium hydroxide or a solution of a corresponding alkaline earth hydroxide, the washing being effected either batchwise or in countercurrent and preferably at room temperature or a temperature deviating only slightly therefrom until a positive reaction with silver nitrate can no longer be observed. The washing of the raw product with alkali is most advantageously carried out in a plurality of stages, the fresh alkali solution being used to wash raw product which has already been treated in several alkali washing stages in order to remove therefrom the last traces of hydrocyanic acid and the alkali solution is thereafter used in one or more previous stages until the more or less exhausted solution is finally used for first stage washing of the raw product. It is desirable to subject the alkali washed product to a subsequent washing with water to remove any traces of solution or cyanide still present in the raw product.

In place of the after-treatment with water, treatment with acid as, for example, with dilute sulfuric acid, is most advantageous, especially in those instances where the alkali solutions employed in the washing for the removal of hydrocyanic acid have been of higher concentration. This aftertreatment is preferably carried out with one or more washings with acid, as, for example, 5 or 10% sulfuric acid, in order to remove any alkali compounds present and is followed preferably by a washing with water.

It has been found to be advantageous for the alkali treatment to be preceded by a simple distillation serving solely for the separation of small quantities of high boiling compounds present in the raw material. This distillation may be effected continuously or batchwise; fractionation is not intended in this step. Distillation may be carried out in a column having only a few trays and the distillate distilling overhead at a temperature up to 90–100° C. is preferably immediately subjected to the treatment with alkali.

Depending on the mode of operation selected, the raw product which is suitable for being charged to the distillation exhibits a pH value which may range between about 3–4 and 8–9. Studies carried out with respect to the distillation of products of this type have established that, surprisingly, the tendency to polymerization in both the feed product and in the resultant fractions is substantially completely eliminated if the pH of the raw product is adjusted to a value of about 5–7 before the distillation is carried out.

If the raw product, after the treatment with alkali, is not subjected to an after-treatment with acid and accordingly has an alkaline pH, the pH value must be adjusted. The acidification to the desired pH value can be effected with any desired acid as, for example, a small amount of 5–50% sulfuric acid or of an organic acid, such as oxalic acid, acetic acid, etc. In general, only small amounts of acid are required and most advantageously an amount below 2% based on the charge, and preferably less than 1% to about 0.1% are sufficient. The amount of acid required is determined by testing in the conventional manner and the indicated amount is added to the raw product and the mixture thoroughly stirred. The aqueous phase which may form is separated, if desired, before subjecting the mixture to distillation. It is also possible, in accordance with the invention, to combine two acids in the acidification, namely, to neutralize first with an inorganic acid such as dilute sulfuric acid, and to adjust the final pH value using an organic acid.

Where the raw product has been washed with acid and the pH value of the resulting product is below 5, it can be adjusted to the desired level by addition of small amounts of alkaline materials, such as sodium hydroxide, potassium hydroxide or calcium hydroxide, which preferably are in the form of their solutions. Again, as above noted, the separation of the aqueous phase which may form is advantageously carried out before distillation.

In order to completely ensure against thermal or catalytic polymerization during the distillation, it has been found advantageous to add to the raw product subsequent to its treatment for removal of hydrocyanic acid small amounts of inhibitors as, for example, para-tert. butyl catechol, hydroquinone-monobenzyl-ether, hydroquinone-monomethyl-ether or similarly acting compounds in solid or dissolved form to the raw product to be distilled. The quantity of inhibitor should preferably amount to between about 0.1 and 1% by weight based on the quantity of feed to be distilled.

The distillation is effected at atmospheric pressure or slightly reduced pressure; as, generally, no drying of the raw nitrile product has been carried out prior to distillation, the first fraction obtained is the azeotrope, the lower aqueous phase of which is withdrawn and the upper organic phase of which is refluxed until no azeotrope whatsoever distills or the amount of water present in the raw unsaturated aliphatic nitrile product has been completely removed.

The invention will be described in greater detail in conjunction with the following specific example which is given for the purpose of illustration. It is not intended to limit the scope of the invention to the details of the example.

1 liter of raw acrylonitrile (830 g.) which has been obtained by catalytic oxidation of propylene in the presence of ammonia, oxygen and steam under intense cooling of the reaction gas at −70° C. to produce a reaction liquor which has a pH value of 10 is mixed with 1 cm.³ of phosphoric acid ($d_{20}$=1.7; about 83%). The pH value of the raw acrylonitrile is about 6.0.

On being distilled in a glass fractionating column provided with Stedman packings (length of the column, 1 meter; diameter, 30 mm.), 105 ml. of pure hydrocyanic acid corresponding to about 98.5% of the total hydrocyanic acid present are distilled off in an overhead temperature of up to 35° C. The fraction boiling at up to 65° C. (3 ml.) is observed to contain about 40% of hydrocyanic acid.

At 70° C., an acrylonitrile water azeotrope is first distilled over and, upon cooling in the receiver, separates into a lower aqueous layer substantially free from hydrocyanic acid. The successively withdrawn individual fractions of 100 ml. each contain 0.05, 0.03 and 0.01% of hydrocyanic acid while the subsequently distilled fractions are entirely free of hydrocyanic acid.

The residue boiling above 85° C. (5%) contains about 5 g. of a semi-solid polymer of unknown composition.

When 150 mg. of an inhibitor as, for example, para-tert. butyl catechol, is added to a further batch of crude acrylonitrile prior to the distillation, the polymer formation is decreased to about 2 g.

The distillates recovered in the two distillation operations are colorless and clear and do not exhibit any tendency to polymerization even after standing for extended periods of time. However, if extended periods of storage are required, it is advantageous to add about 10 mg. of an inhibitor, as, for example, the aforesaid inhibitor per 100 ml. of distillate.

Further distillations carried out in which 2, 3 or 5 ml. of phosphoric acid are added proceeded analogously. No difference is observed when the phosphoric acid is added as a solution as, for example, in 20 ml. of water in order to achieve better mixing.

If an organic acid such as oxalic acid (2.3 g.) is added in place of the phosphoric acid, products of a high degree of purity are also obtained.

The addition of dilute sulfuric acid (10%; 10 ml.) also results in the recovery of very pure products. The polymer formation in the bottom of the column is observed to be higher only to a minor extent when compared with the use of phosphoric acid.

Several comparative distillations carried out without any addition of acid also proceed satisfactorily. However, after a short distillation time, a more or less severe yellowing and, to some extent, a slight turbidity occurs which cannot be removed even by the addition of an inhibitor in the amounts above set out. In the instances of acrylonitrile, products obtained under use of catalysts having a long life period of, for example, more than six months, it has been found to be preferable to first remove the hydrocyanic acid by treatment thereof with an aqueous alkaline solution as, for example, an NaOH solution, as illustrated by the following:

1 liter of raw acrylonitrile is shaken three times with an about 20% caustic soda solution, and lower phase being drained off after each treatment. After having separated off the last alkaline phase, the product is washed twice with 100 ml. each of a 10% sulfuric acid and thereafter once with distilled water. The pH value of the raw acrylonitrile which is now free from hydrocyanic acid is about 6.

The subsequent processing by distillation again first results in an acrylonitrile water azeotrope and thereafter in the pure acrylonitrile fractions. The products are colorless, clear and satisfactory for all applications.

The polymer formation in the bottom of the column amounts to about 2 g.

In a further run, 1 liter of raw acrylonitrile which in this instance is derived from a synthesis operation carried out in the first operating month of a catalyst, the hydrocyanic acid content of which acrylonitrile is 7.5%, is shaken three times with 250 ml. portions of an about 20% caustic soda solution at room temperature and the lower phase which forms is separated off each time. This is followed by two washings, each effected with 75 ml. of water and, after the separation of the last of the water, by the addition of 1 g. of phosphoric acid ($d_{20}$=1.7; about 83%). In the subsequent processing by distillation, the results obtained are the same as before. An acrylonitrile water azeotrope is obtained first; when water no longer distills over, the pure acrylonitrile fractions are obtained. These fractions are likewise clear and colorless and stable on storage for a relatively long period of time. However, when it is desired to store the same over a period of several weeks or more, it is advisable to add about 50 to 100 mg. of an inhibitor such as para-tert. butyl catechol per liter of pure acryonitrile. The amount of polymer remaining in the bottom of the column after termination of the distillation amounts to about 3 g.

We claim:

1. Process for purifying acrylonitrile produced by the catalytic oxidation of propylene in the presence of ammonia and oxygen for the removal therefrom of hydrocyanic acid and polyacrylonitrile which comprises subjecting the crude acrylonitrile to a washing treatment with about a 10–20% aqueous solution of a member selected from the group consisting of alkali metal and alkaline earth metal hydroxides, adjusting the pH of the acrylonitrile obtained from the washing treatment to a value of from about 5–7 by adding to the washed acrylonitrile a member selected from the group consisting of sulfuric, phosphoric, acetic, and oxalic acids, and isolating the substantially pure acrylonitrile from the resulting mixture by a fractional distillation thereof.

2. A process according to claim 1, which comprises maintaining the pH of said acrylonitrile at a value of from about 5–7 by adding to the acrylonitrile where the pH value has dropped below the lower value recited in the range a member selected from the group consisting of sodium hydroxide, potassium hydroxide, and calcium hydroxide.

3. Process according to claim 1 which comprises subjecting said crude acrylonitrile to a distillation prior to said washing with said aqeous alkaline solution and thereafter subjecting the distillate substantially free of high boiling compounds to said washing with said aqueous alkaline solution.

4. Process according to claim 1 which comprises adding from 0.1–1% by weight referred to the alkali washed acrylonitrile of a polymerization inhibitor for said acrylonitrile to said washed acrylonitrile prior to said fractional distillation.

References Cited by the Examiner

UNITED STATES PATENTS

| | | | |
|---|---|---|---|
| 2,351,157 | 6/1944 | Semon | 260—465.9 X |
| 2,555,798 | 6/1951 | Kropa. | |
| 2,653,966 | 9/1953 | Taylor et al. | 260—465.9 |
| 2,784,218 | 3/1957 | McDonald | 260—465.9 |
| 2,793,227 | 5/1957 | Sadle | 260—465.9 |
| 2,827,423 | 3/1958 | Carpenter | 260—465.9 X |
| 3,073,753 | 1/1963 | Hadley et al. | 260—465.9 X |

OTHER REFERENCES

Bergmann, "Acetylene Chemistry," 1948, page 80.

CHARLES B. PARKER, *Primary Examiner.*

JOSEPH P. BRUST, *Assistant Examiner.*